(12) United States Patent
Lin et al.

(10) Patent No.: US 10,129,099 B2
(45) Date of Patent: Nov. 13, 2018

(54) DIFFERENTIATED SERVICES FOR PROTOCOL SUITABLE NETWORK VIRTUALIZATION OVERLAYS

(71) Applicant: International Business Machines Corporation, Armonk, NY (US)

(72) Inventors: Jin Jing Lin, Wuhan (CN); Gang Tang, Nanjing (CN); Jian Hua Xia, Shanghai (CN); Ming Shuang Xian, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 15/238,241

(22) Filed: Aug. 16, 2016

(65) Prior Publication Data

US 2018/0054365 A1    Feb. 22, 2018

(51) Int. Cl.
| | | |
|---|---|---|
| *H04L 12/28* | (2006.01) | |
| *H04L 12/24* | (2006.01) | |
| *H04L 12/715* | (2013.01) | |
| *H04L 29/08* | (2006.01) | |

(52) U.S. Cl.
CPC ......... *H04L 41/5003* (2013.01); *H04L 45/64* (2013.01); *H04L 69/325* (2013.01)

(58) Field of Classification Search
USPC ................................. 370/248, 392
See application file for complete search history.

(56) References Cited

U.S. PATENT DOCUMENTS

| | | | |
|---|---|---|---|
| 9,167,501 B2 | 10/2015 | Kempf et al. | |
| 9,755,898 B2* | 9/2017 | Jain ..................... | H04L 41/0813 |
| 9,825,810 B2* | 11/2017 | Jain ..................... | H04L 41/0813 |
| 2014/0307744 A1 | 10/2014 | Dunbar et al. | |
| 2015/0010001 A1* | 1/2015 | Duda ...................... | H04L 45/74 370/392 |
| 2015/0117471 A1* | 4/2015 | Mizrahi .............. | H04L 63/0485 370/512 |
| 2015/0195178 A1 | 7/2015 | Bhattacharya et al. | |
| 2015/0195197 A1 | 7/2015 | Yong et al. | |
| 2015/0281099 A1* | 10/2015 | Banavalikar ........ | H04L 12/4633 370/230 |
| 2016/0094440 A1 | 3/2016 | Huang et al. | |

(Continued)

OTHER PUBLICATIONS

Shimamura et al., "Architecture for resource controllable NVE to meet service providers' dynamic QoS demands," 2013 Fourth International Conference on the Network of the Future (NOF), Postech, Pohang, Korea, Oct. 2013, 6 pages.

(Continued)

*Primary Examiner* — Phuongchau Ba Nguyen
(74) *Attorney, Agent, or Firm* — VanLeeuwen & VanLeeuwen; David B. Woycechowsky (57) ABSTRACT

An approach is provided in which an information handling system matches packet properties of an egress data packet to a classification rule corresponding to differentiated services (DiffServ) parameters. The information handling system encapsulates the egress data packet with a network virtualization overlay header that includes a DiffServ classification identifier corresponding to the DiffServ classification rule. In turn, the information handling system sends the encapsulated egress data packet to a downstream network component.

19 Claims, 8 Drawing Sheets

(56) References Cited

U.S. PATENT DOCUMENTS

2017/0180213 A1* 6/2017 Li .......................... H04L 41/12

OTHER PUBLICATIONS

Blake et al., "An Architecture for Differentiated Services," Network Working Group, Request for Comments: 2475, The Internet Society, 1998, 37 pages.
Metzler, "Advantages and Disadvantages of Overlay-Based SDN Solutions," Webtorials, Distributed Networking Associates, Inc., Oct. 2014, 2 pages.
Mahalingam et al., "Virtual eXtensible Local Area Network (VXLAN): A Framework for Overlaying Virtualized Layer 2 Networks over Layer 3 Networks," Request for Comments: 7348, The Internet Society, IETF Trust, Aug. 2014, 20 pages.
Enns et al., "NETCONF Configuration Protocol," Network Working Group, Request for Comments: 4741, The Internet Society, IETF Trust, Dec. 2006, 96 pages.
Xia et al., "Quality of Service Marking and Framework in Overlay Networks," Network Working Group, The Internet Society, IETF Trust, Mar. 2015, 12 pages.
Lasserre et al., "Framework for DC Network Virtualization," RFC 7365, The Internet Society, IETF Trust, Oct. 2014, 27 pages.
Sridhan et al., "NVGRE: Network Virtualization using Generic Routing Encapsulation," Network Working Group, The Internet Society, IETF Trust, Apr. 2015, 18 pages.

* cited by examiner

| DiffServ Classification Entries 315 ||||
|---|---|---|---|
| Order | DiffServ Classification Rule | DiffServ Classification ID | DiffServ Parameters |
| 1 | Tenant XYZ | FID1 | Meter/sharp1 |
| 2 | VM Source Port 4 | FID2 | Meter/drop2 |
| 3 | Data Source IP7 | FID3 | ... |

| DiffServ Parameters Entries 335 ||
|---|---|
| DiffServ Classification ID | DiffServ Parameters |
| FID1 | DiffServ Meter/Maker/Shaper/Doper<br><br>DiffServ Scheduler/ Congestion avoidance/ Bandwidth reservation |

DIFFERENTIATED SERVICES FOR PROTOCOL SUITABLE NETWORK VIRTUALIZATION OVERLAYS

BACKGROUND

Differentiated services (DiffServ) is a computer network protocol that specifies a scalable and coarse-grained mechanism for classifying and managing network traffic to provide quality of service (QoS) on modern Internet protocol (IP) networks. DiffServ operates on the principle of traffic classification, whereby each data packet is classified into a particular traffic class. Each traffic class may be managed differently from a QoS perspective to ensure preferential treatment for higher-priority traffic on the network, such as providing low-latency capability to critical network traffic, such as voice or streaming media, while providing simple best-effort service to non-critical services, such as web traffic or file transfers. DiffServ classifies packets and policing at the "edges" of the network and uses a 6-bit differentiated services code point (DSCP) for packet classification in an 8-bit differentiated services field (DS field) in the IP header.

Computer networking has gravitated to cloud computing as a preferred computing environment due to its versatility over traditional computer networks. One aspect of a cloud-computing environment's versatility is its ability to support multiple tenants. To support multiple tenants, cloud-computing environments may employ network virtualization, which provides each tenant its own address space that may overlap other tenants' address spaces. Network virtualization involves packet encapsulation, and Network virtualization over layer 3 (NVO3) is becoming one of the preferred packet encapsulation approaches. NVO3 provides a tunnel technology that encapsulates layer 2 packets to the layer 3 layer and adds an overlay header to extend and divide needed address spaces.

BRIEF SUMMARY

According to one embodiment of the present disclosure, an approach is provided in which in which an information handling system matches packet properties of an egress data packet to a classification rule corresponding to differentiated services (DiffServ) parameters. The information handling system encapsulates the egress data packet with a network virtualization overlay header that includes a DiffServ classification identifier corresponding to the DiffServ classification rule. In turn, the information handling system sends the encapsulated egress data packet to a downstream network component.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
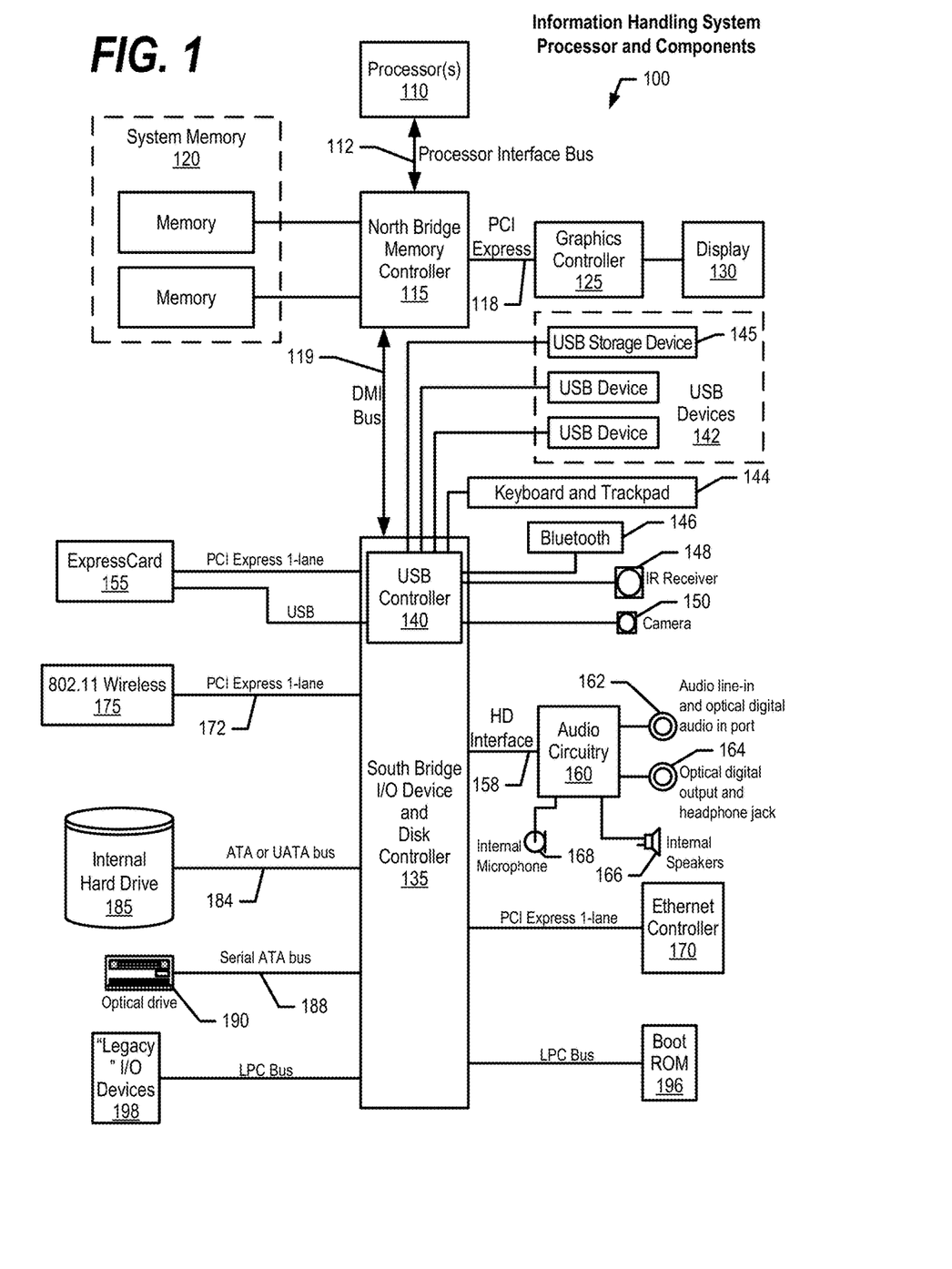
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
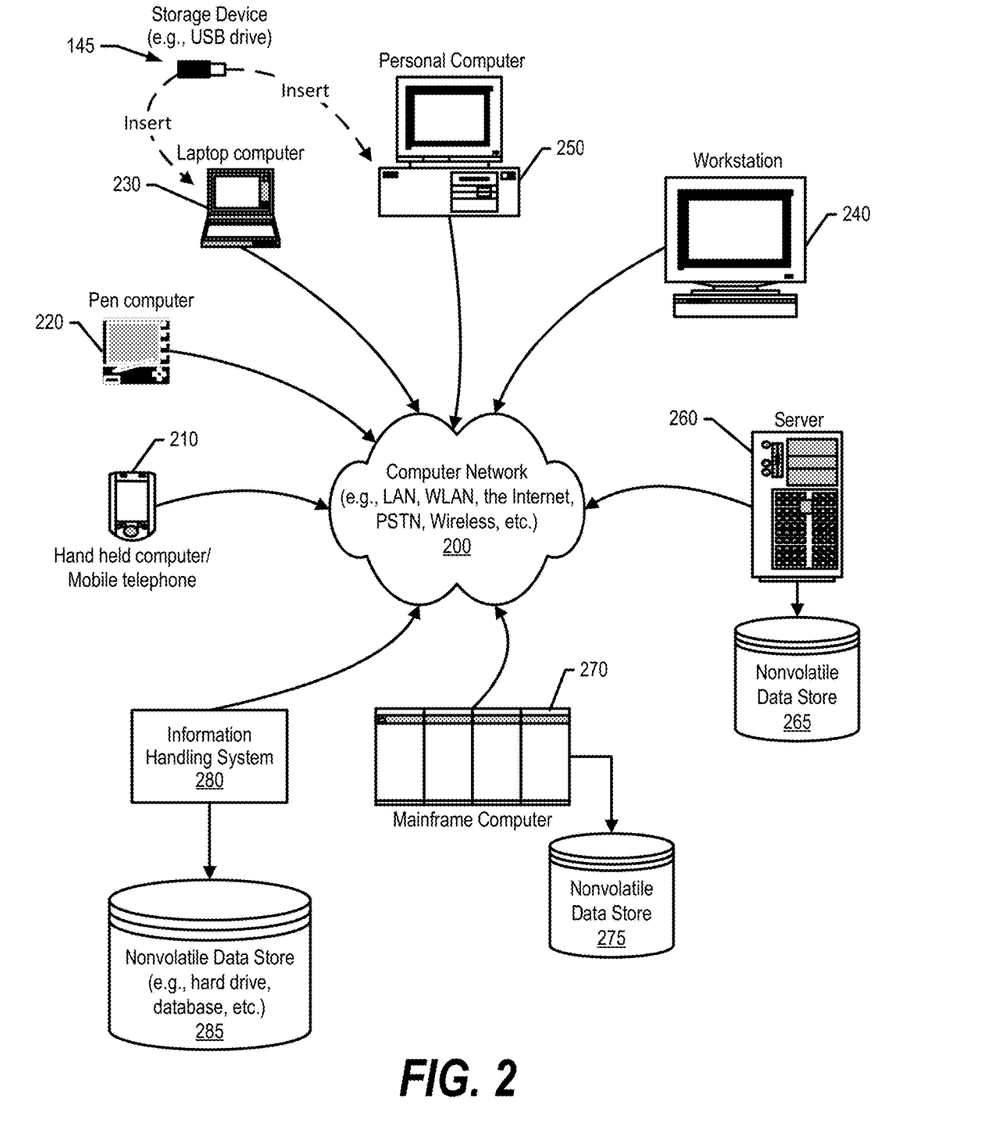
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 8 depict an approach that can be executed on an information handling system to provide differentiated services (DiffServ) features in a cloud computing environment that utilizes NVO3 virtualization. Cloud computing environments that utilize NVO3 virtualization require an approach to provide QoS capabilities. However, issues arise with the prior art because the DiffServ protocol embeds the DiffServ codepoints (DSCPs) into the IP header of a data packet and the NVO3 protocol encapsulates the data packet. As a result, the data packets reaching an underlay ToR switch are encapsulated by the network virtualization edge and, therefore, undetectable by the underlay ToR switch.

To solve the aforementioned issues with the prior art, the approach described herein proceeds through a configuration stage and then a packet processing stage to enable a network virtualization edge to classify egress data packets and an underlay ToR switch to apply DiffServ parameters based on the classification. During the configuration stage, a network virtualization edge receives DiffServ control information from a controller that includes classification information and corresponding DiffServ parameters to apply to the packets. The network virtualization edge stores the DiffServ control information along with unique classification identifiers into a classification entry area. Next, the network virtualization edge sends DiffServ configuration information to the underlay ToR switch that includes the unique classification identifiers and corresponding DiffServ parameters. The underlay ToR switch stores the DiffServ configuration information in a DiffServ parameters entry area to complete the configuration stage.

Next, the network virtualization edge receives an egress data packet from a virtual machine and classifies the data packet by matching the packet's properties to one of the classification entries (e.g., tenant ID, source IP addresses, etc.). The network virtualization edge determines the corresponding unique classification identifier and includes the unique classification identifier in a network virtualization overlay header during encapsulation and sends the encapsulated data packet to the underlay ToR switch. The underlay ToR switch extracts the unique classification identifier from the network virtualization overlay header and matches the unique classification identifier with one of the DiffServ parameter entries. In turn, the underlay ToR switch applies the DiffServ parameters included in the matched entry to the encapsulated data packet and sends the encapsulated data packet onto the computer network.

Figure 3:
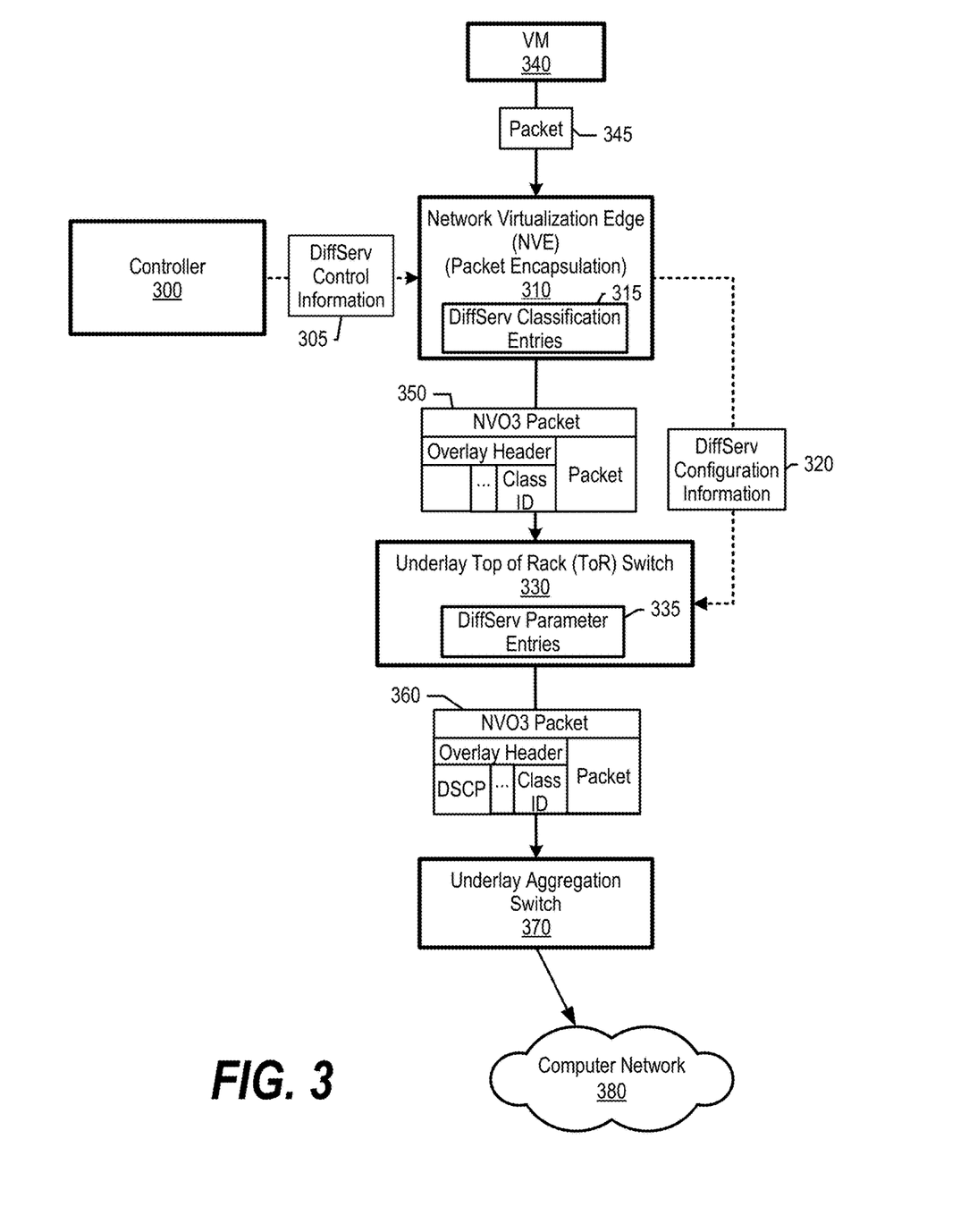
FIG. 3 is an exemplary diagram depicting a network virtualization edge and an underlay Top of Rack (ToR) switch providing differentiated services (DiffServ) in a cloud environment utilizing a network virtualization over layer 3 (NVO3) protocol.

FIG. 3 is an exemplary diagram depicting a network virtualization edge (NVE) and an underlay Top of Rack (ToR) switch providing differentiated services (DiffServ) in a cloud environment that utilizes a network virtualization over layer 3 (NVO3) protocol.

Prior to being able to apply DiffServ features to egress data packets, controller 300, network virtualization edge 310, and underlay ToR switch 330 proceed through a configuration stage. During the configuration stage, an administrator uses controller 300 to provide DiffServ control information 305 to each of network virtualization edge 310's that operate in a cloud environment. DiffServ control information 305 includes various DiffServ classification rules and DiffServ parameters to apply to each of the various DiffServ classification rules. In one embodiment, DiffServ control information 305 includes DiffServ classification rules and corresponding DiffServ parameters for multiple tenants operating in the cloud environment. In this embodiment, the DiffServ classification rules may be based on packet parameters such as tenant, source port of a virtual machine, data source IP of a virtual machine, and/or various ACL (access control list) rules.

Figure 6:
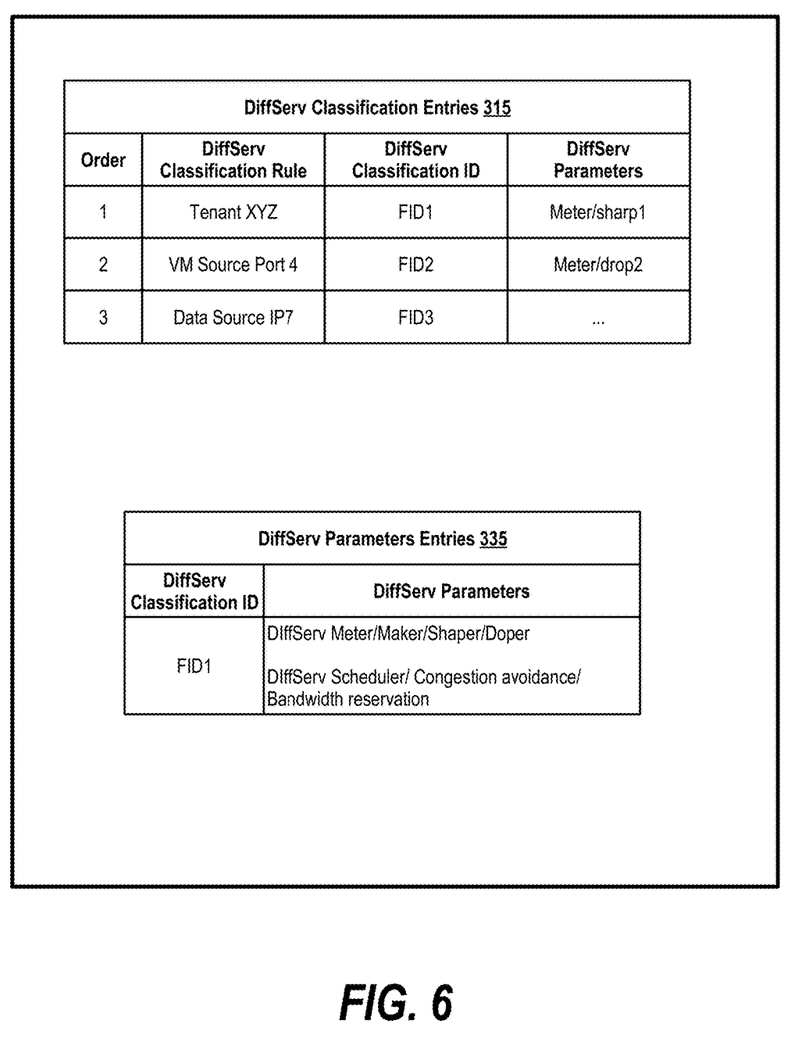
FIG. 6 is an exemplary diagram depicting DiffServ entries generated and utilized by a network virtualization edge and an underlay ToR switch to provide DiffServ capabilities in an NVO3 cloud-based environment.

Network virtualization edge 310 receives DiffServ control information 305 and generates DiffServ classification entries 315, which include a unique identifier and classification rules for each entry (see FIG. 6 and corresponding text for further details). In one embodiment, network virtualization edge 315 may generate a balanced classification identifier based on the unique classification identifier and corresponding packet properties to achieve a desired virtual machine to virtual machine equal-cost multi-path (ECMP)/load balancing (see FIG. 4 and corresponding text for further details).

Next, network virtualization edge 310 sends DiffServ configuration information 320 to underlay ToR switch 330. Network virtualization edge 310 provides DiffServ configuration information 320 because egress data packets that will be sent by network virtualization edge 310 to underlay ToR switch 330 are encapsulated via NVO3 and, therefore, DiffServ parameters traditionally stored in the "inner" egress data packet's header are unreadable by underlay ToR switch 330. To solve this issue, network virtualization edge 310 sends DiffServ configuration information 320 to underlay ToR switch 330 that includes DiffServ information that maps the DiffServ classification identifiers embedded in the network virtualization overlay header to the DiffServ parameters. Underlay ToR switch 330 stores the information in DiffServ parameters entries 335 to complete the configuration stage (see FIG. 6 and corresponding text for further details).

Now that the DiffServ configuration stage is complete, network virtualization edge 310 is able to receive egress packet 345 from virtual machine (VM) 340 and analyze packet 345 against the DiffServ classification rules in DiffServ classification entries 315. For example, packet 345 may include packet properties corresponding to tenant XYZ and classification entries 315 includes a classification rule for tenant XYZ's egress data packets.

When network virtualization edge 310 matches a DiffServ classification entry, network virtualization edge 315 identifies the DiffServ classification entry's corresponding DiffServ classification identifier in classification entries 315 and inserts the DiffServ classification identifier into packet 345's network virtualization overlay header (also referred to herein as overlay header) during NVO3 encapsulation (see encapsulated packet 350). In one embodiment, network virtualization edge 310 inserts the DiffServ classification identifier in the source port field of the overlay UDP (user datagram protocol) field because the 16-bit source port of the overlay UDP field may be changed without affecting the packet forwarding (see FIG. 8 and corresponding text for further details).

Underlay ToR switch 330 receives encapsulated packet 350 and extracts the DiffServ classification identifier from the overlay header. Underlay ToR switch 330 then matches the classification identifier with entries in DiffServ parameter entries 335 to determine which DiffServ parameters to apply to encapsulated packet 350. Underlay ToR switch 330 applies the DiffServ parameters and, in one embodiment, inserts corresponding differentiated services codepoint (DSCP) bits into the type of service field in the overlay header (see encapsulated packet 360) for downstream DiffServ processing purposes. In turn, underlay ToR switch 330 sends encapsulated packet 360 onto underlay aggregation switch 370, which sends encapsulated packet 360 to a destination virtual machine via computer network 380.

Figure 4:
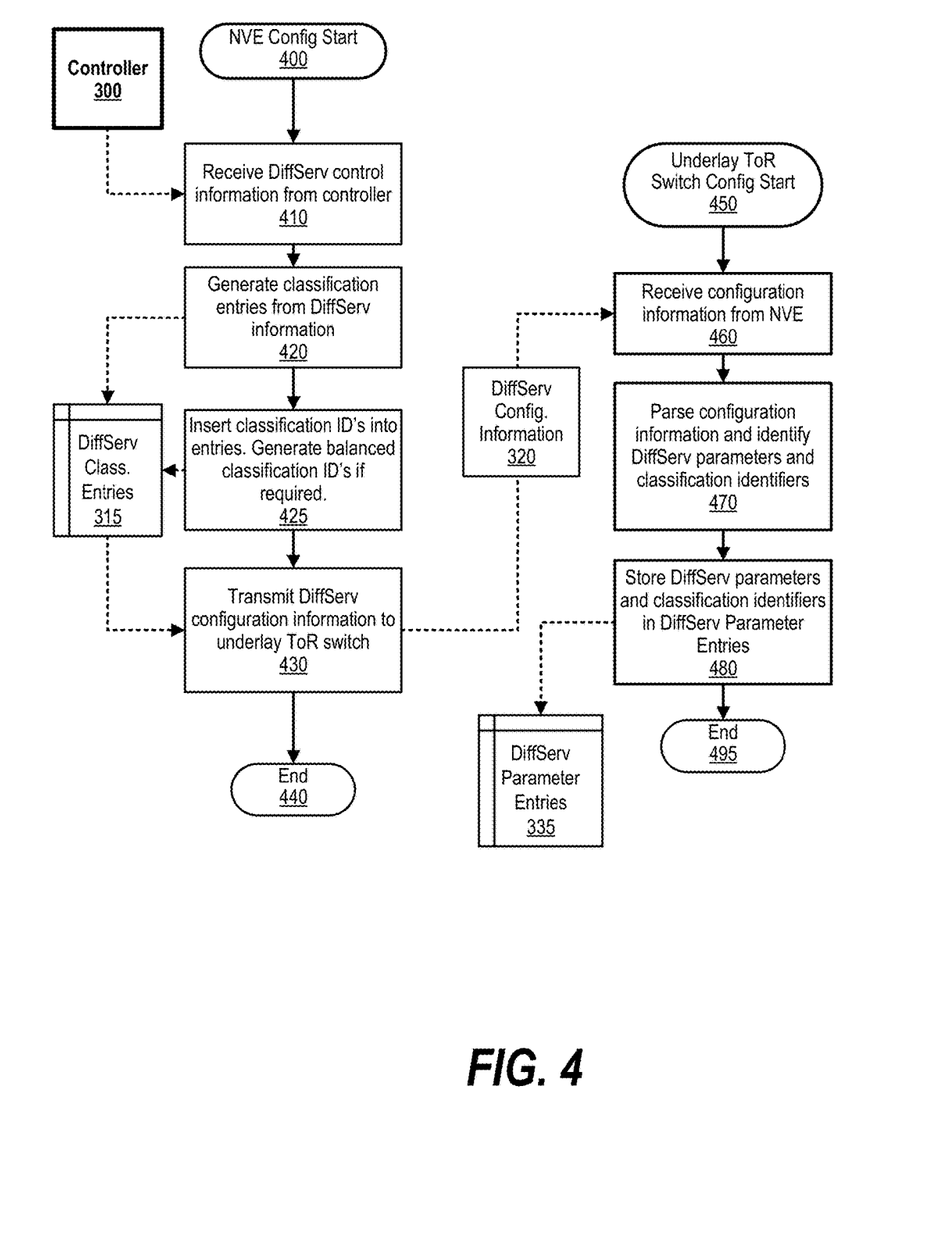
FIG. 4 is an exemplary flowchart depicting steps taken to configure a network virtualization edge and underlay ToR switch to provide DiffServ capabilities in a cloud environment that implements an NVO3 virtual overlay protocol.

FIG. 4 is an exemplary flowchart depicting steps taken to configure a network virtualization edge and an underlay ToR switch to provide DiffServ capabilities in a cloud environment with an NVO3 virtual overlay implementation. Network virtualization edge configuration processing commences at 400 whereupon, at step 410, the network virtualization edge receives DiffServ control information from controller 300. The DiffServ control information may include DiffServ classification rules, DiffServ classification identifiers, and DiffServ parameters.

At step 420, the network virtualization edge generates DiffServ classification entries 315 from the DiffServ control information. In one embodiment, DiffServ classification entries 315 include an entry for each DiffServ classification rule along with its corresponding DiffServ parameters and DiffServ classification identifier. The network virtualization edge, at step 425, inserts the DiffServ classification identifiers into each entry, which the network virtualization edge subsequently utilizes to convey a packet's DiffServ classification to the underlay ToR switch (see FIG. 6 and corresponding text for further details). In one embodiment, the network virtualization edge generates balanced classification identifiers, such as when the network virtualization edge would not be able to achieve a desired VM-VM equal-cost multi-path (ECMP)/load balancing. For example, in this embodiment, the network virtualization edge generates balanced classification identifiers for rules that may 1) only match tenant ID; 2) only match the source port of virtual machine; or 3) only match the source IP of virtual machine. The network virtualization edge may use an algorithm such as:

Balanced Class ID=Base Class ID+(Hash(Inner Packet))% $N$ where N is the number of ECMP/Load balancers according to the size of ECMP supported on a current underlay ToR switch.

At step 430, the process transmits DiffServ configuration information 320 to the underlay ToR switch. In one embodiment, DiffServ configuration information 320 includes DiffServ classification identifiers (or balanced classification identifiers) and their corresponding DiffServ parameters (see FIG. 5 and corresponding text for further details). Network virtualization edge processing thereafter ends at 440.

Underlay ToR switch configuration processing commences at 450 whereupon, at step 460, the underlay ToR switch receives DiffServ configuration information 320 from the network virtualization edge. At step 470, the underlay ToR switch parses DiffServ configuration information 320 and identifies the DiffServ classification identifiers and corresponding DiffServ parameters. The underlay ToR switch, at step 480, stores the DiffServ classification identifiers with their corresponding DiffServ parameters in DiffServ parameter entries 335 (see FIG. 6 and corresponding text for further details). Underlay ToR switch processing thereafter ends at 495.

Figure 5:
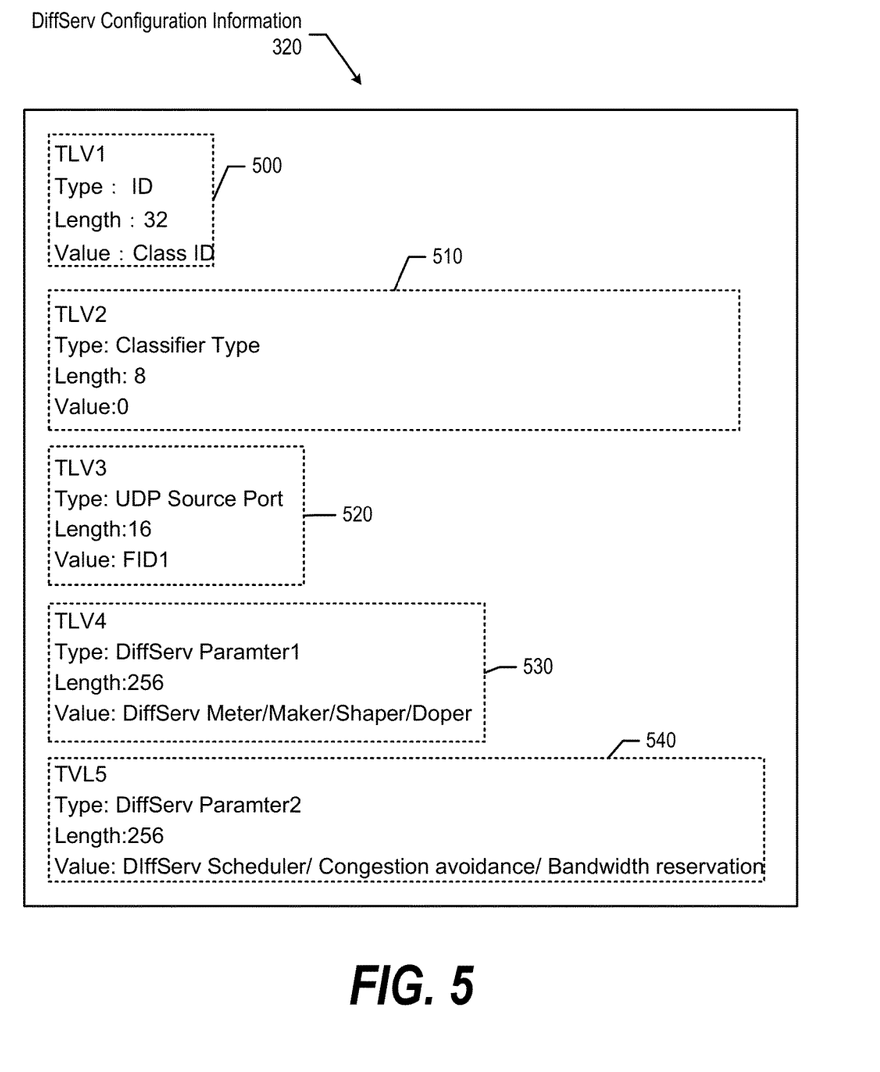
FIG. 5 is an exemplary diagram depicting various DiffServ configuration parameters that are sent by an network virtualization edge to an underlay ToR switch.

FIG. 5 is an exemplary diagram depicting DiffServ configuration information 320 sent by the network virtualization edge to the underlay ToR switch. The example shown in FIG. 5 depicts DiffServ configuration information 320 in a link layer discovery protocol (LLDP) format that adopts a type-length value (TLV) structure. As those skilled in the art can appreciate, network virtualization edge 310 may use different protocols and/or formats to provide DiffServ configuration information to underlay ToR switch 330.

The example shown in FIG. 5 includes five TLV structures in DiffServ configuration information 320. As those skilled in the art can appreciate, more or less TLV structures may be included in DiffServ configuration information 320. TLV1 500 indicates a classification identifier corresponding to a DiffServ classification entry in classification entries 315. TLV2 510 identifies a Classifier Type with a value of 0 to indicate that the DiffServ classification identifier will be located in the overlay header's UDP source port field. In one embodiment, the classifier type may be changed to a different value to indicate that DiffServ classification identifier will be in a different header field.

TLV3 520 includes a UDP source port value such as "FID2," which is the DiffServ classification identifier that corresponds to the DiffServ parameters in TLV 4 530 and TLV 5 540. Underlay ToR switch 330, in turn, generates DiffServ parameter entries 335 using the information from DiffServ configuration information 320 (see FIG. 6 and corresponding text for further details).

FIG. 6 is an exemplary diagram depicting DiffServ entries generated and utilized by a network virtualization edge and an underlay ToR switch to provide DiffServ capabilities in a NVO3 cloud-based environment. In one embodiment, DiffServ classification entries 315 includes DiffServ classification entries based on factors such as an egress packet's corresponding tenant, the source port of a virtual machine, the data source IP address of a virtual machine, and/or various ACL rules. In another embodiment, the entries in DiffServ classification entries 315 are organized in order of importance and the network virtualization edge applies the most important DiffServ parameters to a packet. For example, network virtualization edge 310 may compare packet properties to the first DiffServ entry and, if a match does not occur, network virtualization edge 310 compares the packet properties to the second entry, and so on.

DiffServ parameter entries 335 includes entries generated by underlay ToR switch 330 based on DiffServ configuration information 320. Each entry includes a DiffServ classification identifier and corresponding DiffServ parameters to apply to encapsulated egress data packets. As discussed herein, underlay ToR switch 330 matches DiffServ classification identifiers extracted from overlay headers of encapsulated packets with entries in DiffServ parameter entries 335 and applies the corresponding DiffServ parameters to the encapsulated packets.

Figure 7:
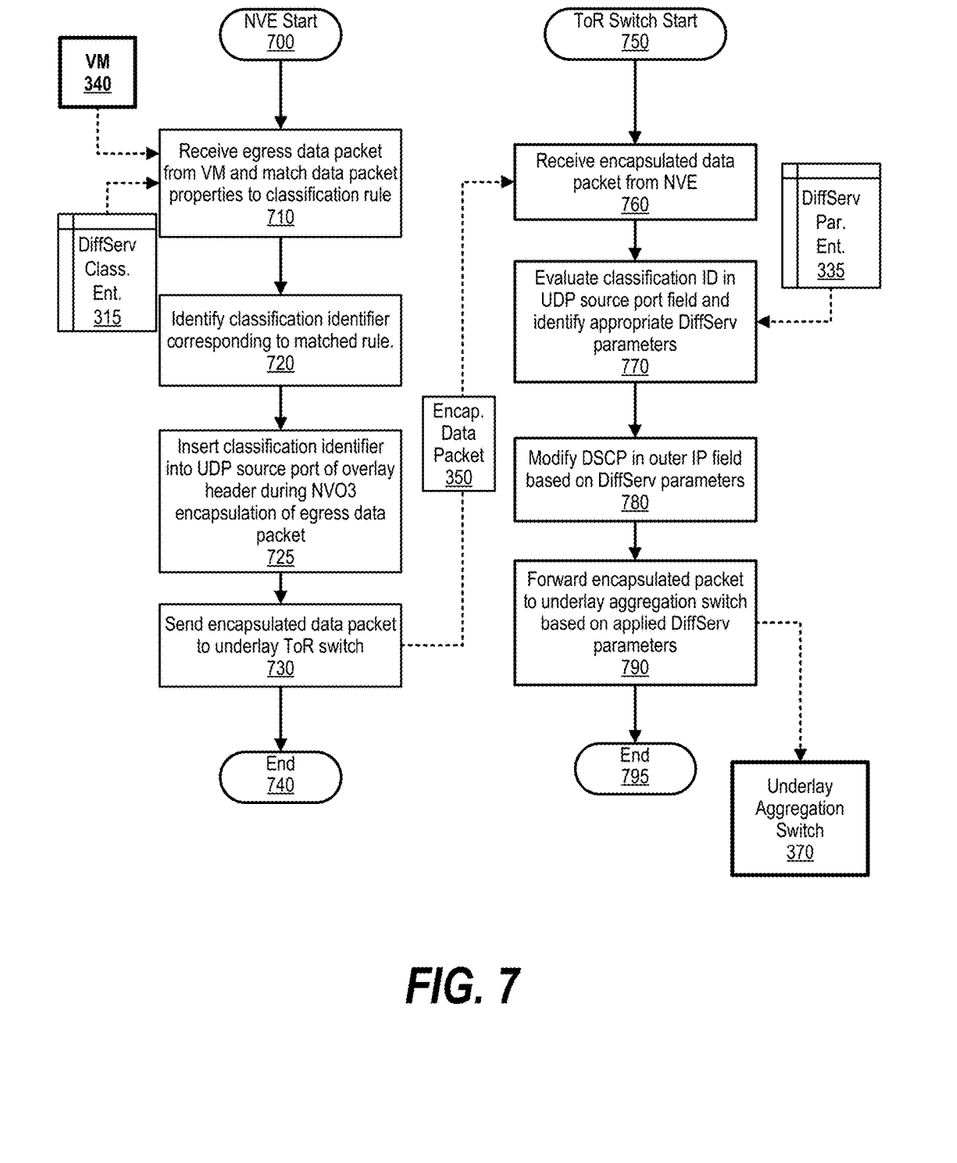
FIG. 7 is an exemplary flowchart depicting steps taken by a network virtualization edge and an underlay ToR switch to apply DiffServ parameters to NVO3 encapsulated packets.

FIG. 7 is an exemplary flowchart depicting steps taken by a network virtualization edge and an underlay ToR switch to apply DiffServ parameters to NVO3 encapsulated data packets. Network virtualization edge processing commences at 700 whereupon, at step 710, the network virtualization edge receives a data packet (packet 345) from VM 340 and matches the data packet's properties to a DiffServ classification rule in DiffServ classification entries 315. For example, a DiffServ classification rule may be based on a tenant ID that matches the tenant ID of packet 345. In another example, a classification rule may be based on the source port of VM 340 that provided packet 345 and the network virtualization edge matches VM 340 to the particular classification rule.

Figure 8:
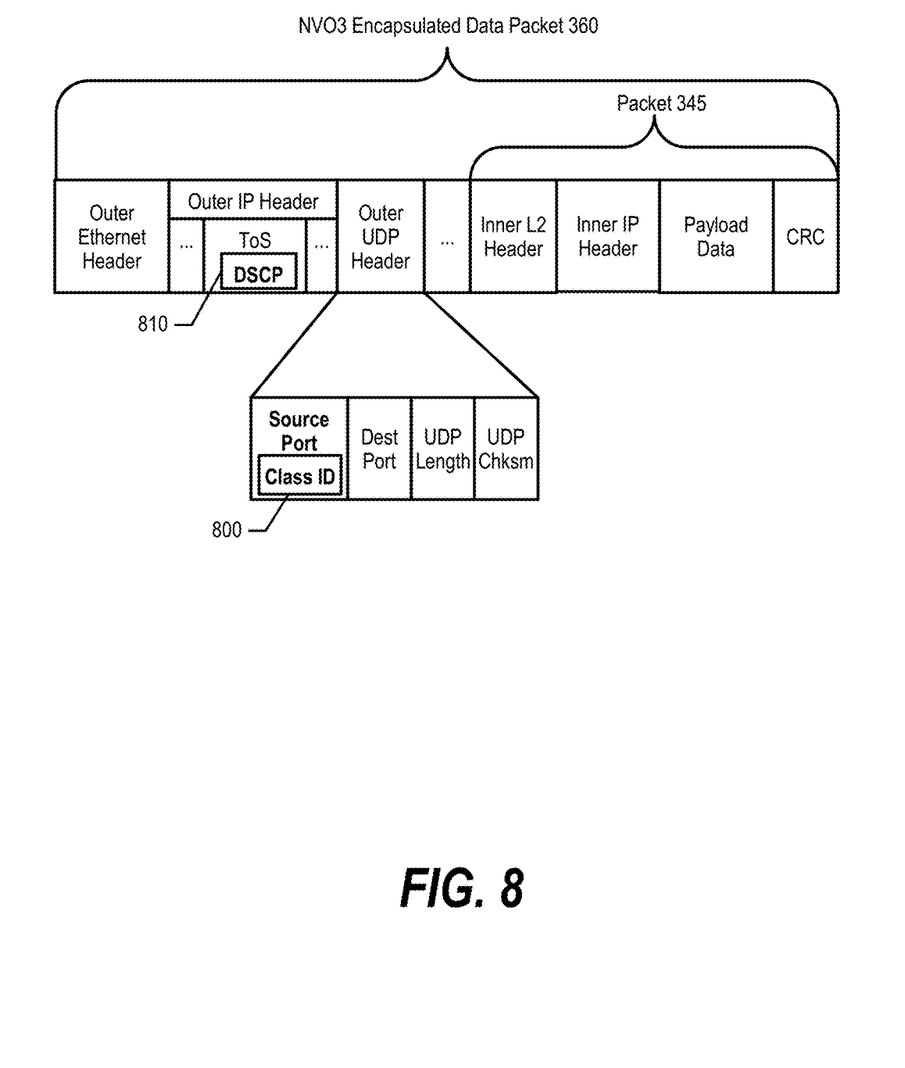
FIG. 8 is an exemplary diagram depicting an NVO3 encapsulated data packet with DiffServ information.

At step 720, the network virtualization edge identifies a DiffServ classification identifier in the DiffServ classification rule that contains the matched DiffServ classification rule and, at step 725, the network virtualization edge inserts the DiffServ classification identifier into the network virtualization overlay header's UDP source port during NVO3 encapsulation. Referring to FIG. 8, network virtualization edge 310 inserts classification ID 800 into the source port field of the outer UDP header during encapsulation. At step 730, the network virtualization edge sends encapsulated data packet 350 to the underlay ToR switch and network virtualization edge processing thereafter ends at 740.

Underlay ToR switch processing commences at 750 whereupon, at step 760, the underlay ToR switch receives encapsulated data packet 350. At step 770, the underlay ToR switch extracts the DiffServ classification identifier from the UDP source port field and matches the DiffServ classification identifier to an entry in DiffServ parameter entries 335. For example and referring to FIG. 6, encapsulated data packet 350's DiffServ classification identifier may be "FID1" and the underlay ToR switch matches the DiffServ classification identifier to the entry in DiffServ parameter entries 335.

At step 780, in one embodiment and referring to FIG. 8, the underlay ToR switch inserts/modifies differentiated services code point (DSCP) 810 in the outer IP field based on the identified DiffServ parameters for downstream component processing. At step 790, the underlay ToR switch sends the encapsulated packet to underlay aggregation switch 370 based on the DiffServ parameters and underlay ToR switch processing thereafter ends at 795.

FIG. 8 is an exemplary diagram depicting an NVO3 encapsulated data packet that includes a DiffServ classification identifier in its network virtualization overlay header. Network virtualization edge 310 receives packet 345 and encapsulates packet 345 according to NVO3 protocols. During the encapsulation process, network virtualization edge 310 inserts classification identifier 800 into the outer UDP source port field as described herein. In one embodiment, network virtualization edge 310 chooses the outer UDP source port field because, per industry standards, the outer UDP source port field's value may be changed without affecting the packet forwarding process. As those skilled in the art can appreciate, network virtualization edge 310 may place the DiffServ classification identifier in other fields according to various industry standards or even a mixture of multiple fields.

When underlay ToR switch 330 receives encapsulated packet 350, underlay ToR switch 330 identifies the DiffServ parameters to apply to the packet as discussed herein, and then may add DSCP 810 to the Type of Service (ToS) field in the outer IP header to inform downstream components how to process the packet.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system, the method comprising:
    configuring a computer network comprising an edge device and a downstream network component, the configuring comprising:
        creating, by the edge device, a set of differentiated services (DiffServ) configuration information that comprises a set of classification identifiers and a set of DiffServ parameters, the set of classification identifiers and the set of DiffServ parameters each corresponding to a set of classification rules; and
        sending the DiffServ configuration information from the edge device to the downstream network component;
    in response to the configuring of the computer network, the method further comprises:
        matching, by the edge device, one or more packet properties of an egress data packet to a classification rule included in the set of classification rules;
        selecting, by the edge device, a classification identifier from the set of classification identifiers that corresponds to the matched classification rule;
        encapsulating, by the edge device, the egress data packet with a network virtualization overlay header, wherein the encapsulating comprises embedding the selected classification identifier into the networking virtualization overly header; and
        transmitting, by the edge device, the encapsulated egress data packet to the downstream network component over the computer network wherein the downstream network component is adapted to process the encapsulated egress data packet based on the set of DiffServ configuration information sent by the edge device during the configuring of the computer network.

2. The method of claim 1 wherein the network virtualization overlay header corresponds to a protocol suitable to support network virtualization overlays, and wherein the edge device is a network virtualization edge, and wherein the downstream network component is an underlay Top of Rack (ToR) switch.

3. The method of claim 2 wherein the configuring of the computer network further comprises:
    storing, at the underlay ToR switch, the set of DiffServ configuration information as a set of DiffServ parameter entries, wherein each of the set of DiffServ parameter entries comprise at least one of the set of classification identifiers and a corresponding at least one of the set of DiffServ parameters.

4. The method of claim 3 further comprising:
    extracting, by the underlay ToR switch, the embedded classifier identifier from the network virtualization overlay header in response to receiving the encapsulated egress data packet;
    matching the extracted classifier identifier to one of the set of classifier identifiers stored in a selected one of the set of DiffServ parameter entries;
    identifying one or more of the set of DiffServ parameters included in the selected DiffServ parameter entry; and
    applying the identified one or more DiffServ parameters to the encapsulated egress data packet.

5. The method of claim 4 further comprising:
    determining, by the underlay ToR switch, a differentiated services codepoint (DSCP) that corresponds to the one or more DiffServ parameters; and
    inserting the DSCP into the network virtualization overlay header.

6. The method of claim 3 wherein, prior to the matching, the DiffServ classification identifier and the one or more DiffServ parameters are sent from the network virtualization edge to the underlay ToR switch in a plurality of type-length value (TLV) structures using a link layer discovery protocol (LLDP).

7. The method of claim 6 wherein:
    the DiffServ classification identifier is inserted by the network virtualization edge into a UDP source port field in the network virtualization overlay header; and at least one of the plurality of TLV structures indicate that the DiffServ classification identifier is located in the UDP source port field.

8. The method of claim 1 further comprising:
generating a balanced classification identifier based on the DiffServ classification identifier and at least one of the one or more packet properties; and
including the balanced classification identifier in the network virtualization overlay header.

9. The method of claim 1 wherein the computer network is a cloud-based computer network that supports a plurality of tenants having one or more overlapping address spaces.

10. An information handling system comprising:
one or more processors;
a memory coupled to at least one of the processors; and
a set of computer program instructions stored in the memory and executed by at least one of the processors in order to perform actions of:
configuring a computer network comprising an edge device and a downstream network component, the configuring comprising:
creating, by the edge device, a set of differentiated services (DiffServ) configuration information that comprises a set of classification identifiers and a set of DiffServ parameters, the set of classification identifiers and the set of DiffServ parameters each corresponding to a set of classification rules; and
sending the DiffServ configuration information from the edge device to the downstream network component;
in response to the configuring of the computer network, the method further comprises:
matching, by the edge device, one or more packet properties of an egress data packet to a classification rule included in the set of classification rules;
selecting, by the edge device, a classification identifier from the set of classification identifiers that corresponds to the matched classification rule;
encapsulating, by the edge device, the egress data packet with a network virtualization overlay header, wherein the encapsulating comprises embedding the selected classification identifier into the network virtualization overlay header; and
transmitting, by the edge device, the encapsulated egress data packet to the downstream network component over the computer network wherein the downstream network component is adapted to process the encapsulated egress data packet based on the set of DiffServ configuration information sent by the edge device during the configuring of the computer network.

11. The information handling system of claim 10 wherein the network virtualization overlay header corresponds to a protocol suitable to support network virtualization overlays, and wherein the edge device is a network virtualization edge, and wherein the downstream network component is an underlay Top of Rack (ToR) switch.

12. The information handling system of claim 11 wherein at least one of the one or more processors perform additional actions comprising:
storing, at the underlay ToR switch, the set of DiffServ configuration information as a set of DiffServ parameter entries, wherein each of the set of DiffServ parameter entries comprise at least one of the set of classification identifiers and a corresponding at least one of the set of DiffServ parameters.

13. The information handling system of claim 12 wherein at least one of the one or more processors perform additional actions comprising:
extracting, by the underlay ToR switch, the embedded classifier identifier from the network virtualization overlay header in response to receiving the encapsulated egress data packet;
matching the extracted classifier identifier to one of the set of classifier identifiers stored in a selected one of the set of DiffServ parameter entries;
identifying one or more of the set of DiffServ parameters included in the selected DiffServ parameter entry; and
applying the identified one or more DiffServ parameters to the encapsulated egress data packet.

14. The information handling system of claim 13 wherein at least one of the one or more processors perform additional actions comprising:
determining, by the underlay ToR switch, a differentiated services codepoint (DSCP) that corresponds to the one or more DiffServ parameters; and
inserting the DSCP into the network virtualization overlay header.

15. The information handling system of claim 12 wherein, prior to the matching, the DiffServ classification identifier and the one or more DiffServ parameters are sent from the network virtualization edge to the underlay ToR switch in a plurality of type-length value (TLV) structures using a link layer discovery protocol (LLDP).

16. The information handling system of claim 15 wherein:
the DiffServ classification identifier is inserted by the network virtualization edge into a UDP source port field in the network virtualization overlay header; and
at least one of the plurality of TLV structures indicate that the DiffServ classification identifier is located in the UDP source port field.

17. The information handling system of claim 10 wherein at least one of the one or more processors perform additional actions comprising:
generating a balanced classification identifier based on the DiffServ classification identifier and at least one of the one or more packet properties; and
including the balanced classification identifier in the network virtualization overlay header.

18. The information handling system of claim 10 wherein the computer network is a cloud-based computer network that supports a plurality of tenants having one or more overlapping address spaces.

19. A method implemented by an information handling system, the method comprising:
receiving, at an underlay Top of Rack (ToR) switch, DiffServ configuration information from a network virtualization edge;
creating, at the underlay ToR switch, a plurality of DiffServ parameter entries based on the DiffServ configuration information, wherein a selected one of the DiffServ parameter entries includes a DiffServ classification identifier and one or more DiffServ parameters;
receiving, at the underlay ToR switch, an encapsulated egress data packet from the network virtualization edge, wherein the encapsulated egress data packet is encapsulated with a network virtualization overlay header;
matching, by the underlay ToR switch, a DiffServ classification identifier embedded in the network virtualization overlay header to the DiffServ classification identifier included in the selected DiffServ parameter entry;

identifying, by the underlay ToR switch, the one or more DiffServ parameters that correspond to a DiffServ classification identifier included in the network virtualization overlay header, wherein the identifying further comprises matching the DiffServ classification identifier included in the network virtualization overlay header to the DiffServ classification identifier included in the selected DiffServ parameter entry; and transmitting the encapsulated egress packet to a downstream network component at a quality of service (QoS) level based on the one or more DiffServ parameters.

* * * * *